United States Patent [19]

Takeuchi et al.

[11] Patent Number: 5,201,393

[45] Date of Patent: Apr. 13, 1993

[54] ASSEMBLAGE MECHANISM IN A CLUTCH RELEASE ASSEMBLY

[75] Inventors: Hiroshi Takeuchi; Hiroshi Uehara, both of Neyagawa, Japan

[73] Assignee: Daikin Clutch Corporation, Neyagawa, Japan

[21] Appl. No.: 836,392

[22] Filed: Feb. 18, 1992

[30] Foreign Application Priority Data

Feb. 21, 1991 [JP] Japan .................. 3-014603[U]

[51] Int. Cl.⁵ .................................. F16D 23/14
[52] U.S. Cl. .......................... 192/70.13; 192/89 B; 192/98
[58] Field of Search ............... 192/70.13, 89 B, 98, 192/110 B, DIG. 1

[56] References Cited

U.S. PATENT DOCUMENTS

| | | | |
|---|---|---|---|
| 4,228,882 | 10/1980 | Huber et al. ........................ | 192/98 |
| 4,588,061 | 5/1986 | Mallet ................................ | 192/98 |
| 4,658,945 | 4/1987 | Muller .............................. | 192/89 B |
| 4,718,528 | 1/1988 | Caron et al. ....................... | 192/98 |
| 4,858,741 | 8/1989 | Maycock et al. .................... | 192/98 |
| 4,872,539 | 10/1989 | Gay et al. .......................... | 192/98 |
| 4,903,807 | 2/1990 | Kabayama et al. .................. | 192/98 |
| 4,947,975 | 8/1990 | Tojima ............................. | 192/98 |

FOREIGN PATENT DOCUMENTS 2211264 6/1989 United Kingdom ............. 192/89 B

*Primary Examiner*—Richard M. Lorence
*Attorney, Agent, or Firm*—Armstrong, Westerman, Hattori, McLeland & Naughton

[57] ABSTRACT

A release assembly releases a pull-type clutch by extracting the radially inward portion of its diaphragm spring in the direction of an associated transmission. It comprises a support member fixed onto the radially inward margin of the diaphragm spring; a wire ring retained in the interior of the support member; and a release bearing which includes an inner race member having an axial sleeve extension which fastens to the support member through the wire ring, and a retaining part for holding the wire ring securely and coaxially when the release bearing is connected or disconnected to the support member. The wire ring thus cannot impede smooth installation of the release bearing into the support member.

8 Claims, 4 Drawing Sheets

ASSEMBLAGE MECHANISM IN A CLUTCH RELEASE ASSEMBLY

BACKGROUND OF THE INVENTION

The present invention relates generally to a release assembly. More specifically, it relates to a clutch release assembly which releases a pull-type clutch by extracting the radially inward margin of its diaphragm spring in the direction of an associated transmission.

Conventional clutches of this type are composed of a clutch disc assembly and a clutch cover assembly having a diaphragm spring which urges a pressure plate toward the flywheel of a motor vehicle engine, and thus compresses the clutch disc between the pressure plate and the flywheel in order to engage the clutch. The release assembly to a pull-type clutch extracts the radially inward margin of the diaphragm spring toward the transmission in order to release the clutch.

A conventional release assembly for a pull-type clutch includes a release bearing whose inner race member extends in the axial direction and into a support member fixed onto the radially inward margin of the diaphragm spring. The extension of inner race member and the support member are fastened detachably through a wire ring.

The wire ring is fitted onto a wedge collar which is retained by the support member, and the extension of inner race member is either connected or disconnected to the support member. In releasing the clutch, the operating force in the inner race member is applied to the support member through the wire ring and the wedge collar. Since the cylindrical wedge collar is composed of stamped and folded sheet metal, the wedge collar is subject to breakage by the operating force during clutch release.

This has led to the disclosure of a release assembly for a pull-type clutch omitting the wedge collar in Japanese Patent Laying-Open No. 37522/1987. This release assembly includes a hub (support member) which is connected to the diaphragm spring and has an inner groove for retaining the wire ring. The groove is formed such that its diameter is greater than the outside diameter of the wire ring, to allow elastic expansion of the wire ring in the radial direction.

Before the release bearing is connected into the hub, the wire ring of the release assembly disclosed in the aforementioned document is held in axial retention by the groove of the hub, while, since its outside diameter is formed to be less than the maximum diameter of the groove, it has radial play. This play is taken up by the expansion of the wire ring into the groove of the hub during installation. Consequently, smooth connection of the release bearing into the hub is hindered since prior to installation the wire ring is out of coaxiality with the hub and the release bearing.

SUMMARY OF THE INVENTION

It is an object of the present invention to enable the process of connecting a wedge-collarless release bearing into its support member of the release assembly to a pull-type clutch to be as smooth as possible.

A release assembly according to the present invention releases a pull-type clutch by extracting the radially inward portion of the diaphragm spring in the direction of an associated transmission. It comprises a support member fixed onto the radially inward margin of the diaphragm spring, a wire ring retained in the interior of the support member, a release bearing including an inner race having an axial extension which is connected or disconnected to the support member through the wire ring, and a retaining part for holding the wire ring in place in the support member when the release bearing is connected to the support member.

Prior to assembly, the wire ring of the aforementioned release assembly is held in place in the support member by the retaining part and cannot move, thus enabling the release bearing to be smoothly installed into the support member.

The foregoing and other objects and advantages of the present invention will become more apparent from the following detailed description.

DESCRIPTION OF THE PREFERRED EMBODIMENTS

Figure 1:
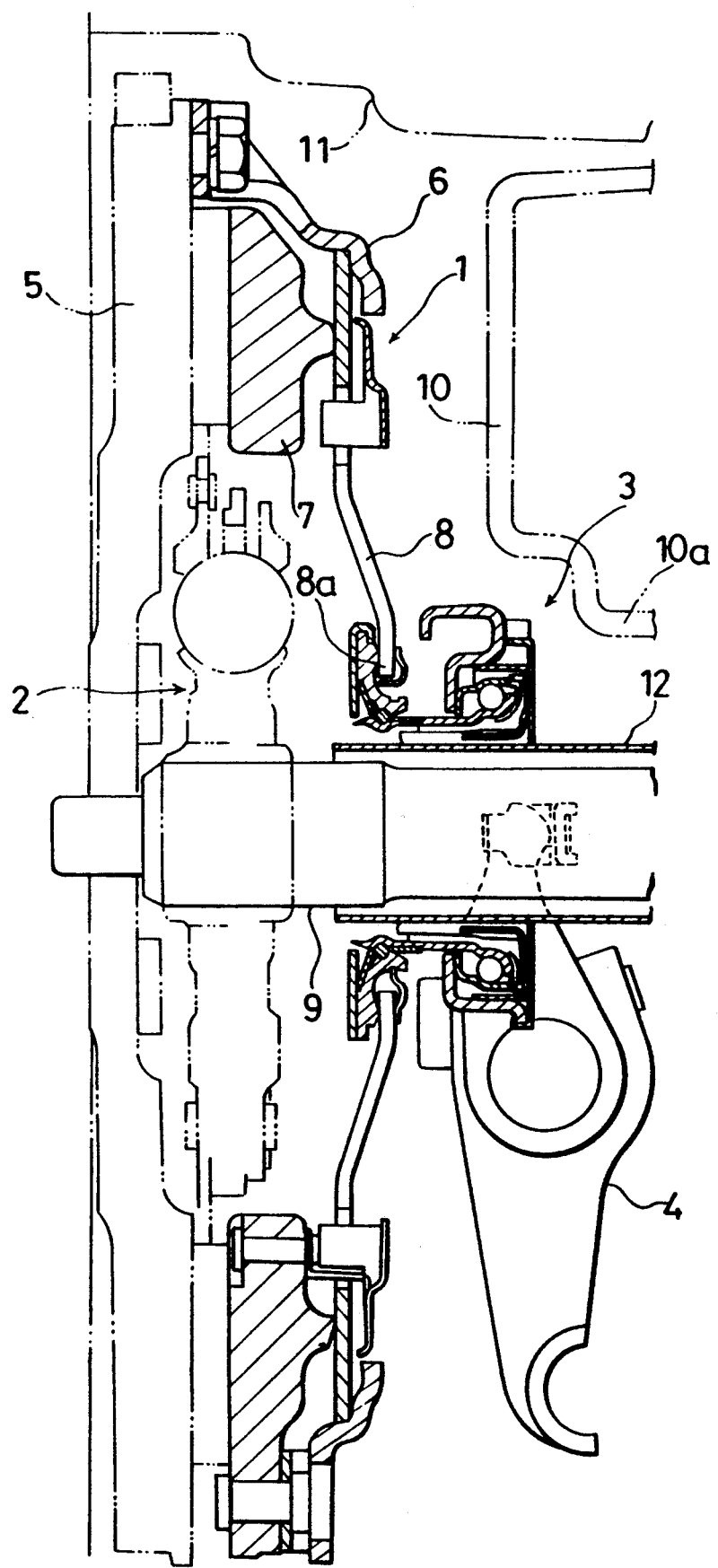
FIG. 1 is an axial cross section of a pull-type clutch according to an embodiment of the present invention.

An embodiment of the present invention is applied to a pull-type clutch shown in FIG. 1, wherein the clutch is seen to be composed principally of a clutch cover assembly 1, a clutch disc assembly 2 and a release assembly 3.

The clutch cover assembly 1 includes a clutch cover 6 fixed to a flywheel 5 which is attached to the output shaft of an engine, a pressure plate 7 disposed inside the clutch cover 5, and a diaphragm spring 8. The transmission-ward side of the diaphragm spring 8 is supported along its circumferential portion by the clutch cover 6, and the diaphragm spring 8 elastically drives the pressure plate 7 toward the clutch disc assembly 2. Radial slits are provided in the diaphragm spring 8 from the border of its radially inward margin 8a to its middle portion. The radially inward margin 8a is connected to the release assembly 3.

Friction facings are provided along the radially outward portion of the clutch disc assembly 2 which are in a sandwich between the flywheel 5 and the pressure plate 7. The central portion of the clutch disc assembly 2 is connected to a forward (leftward in FIG. 1) end of a main drive shaft 9 of a transmission by meshed splines.

A transmission housing 10 is provided to the rear (rightward in FIG. 1), into which the rearward portion of the main drive shaft 9 (transmission input shaft) splined to the clutch disc assembly 2 extends. On the forward end of the transmission housing 10 and integral with it a clutch housing 11 which encompasses the clutch cover assembly 1 and the flywheel 5 is provided. A front cover 10a of the transmission housing 10 has an axial sleeve collar 12 in the middle, through which the main drive shaft 9 is inserted.

Detailed description will now be made of the assembled release assembly 3 with reference to FIG. 2, in which the line O—O is the axis of rotation thereof. The release assembly 3 is principally composed of release bearing 21, a wire ring 23, and a lever plate 24.

The release bearing 21 is fitted onto the sleeve collar 12 slidably in the axial direction. The release bearing 21 includes an outer race member connected to a release fork 4 (shown in FIG. 1), which is fixed pivotably to the transmission housing 10 and drives the release bearing 21 in the axial direction. An inner race member 22 of the release bearing 21 includes a sleeve extension 22a extending forward in the axial direction. Along the periphery at the tip of the sleeve extension 22a is a tapered surface 22b, sloping radially inward away from the transmission. Rearward of the tapered surface 22b, an annular engagement groove 22c (third annular groove), semi-circular in cross section, and a notch 22d having circumference the diameter of which is less that of the sleeve extension 22a to the rear therefrom.

The wire ring 23 is broken so as to be elastically deformable in the radial direction, is circular in cross section and fastens into the engagement groove 22c.

A cylindrical slip collar 25 is fitted in the notch 22d of the inner race extension 22a and is slidable axially. The rear end of the slip collar 25 abuts the end of notch groove 22d and its front end abuts the wire ring 23. The slip collar 25 is movable into the position wherein its forward portion encloses the engagement groove 22c.

The lever plate 24 is composed of a hub portion 24a disposed surrounding the periphery of the sleeve extension 22a, and a flange 24b extending radially outward from and integral with the forward end of the hub portion 24a. The radially inward portion 8a of the diaphragm spring 8 is clasped between the flange 24b and a first bracket plate 26 fixed along the lever plate 24. The lever plate 24 is thus connected to the diaphragm spring 8.

A first annular groove 24c is formed along a rim of the interior of the hub portion 24a of the lever plate 24. The first annular groove 24c opens on a radially inward, forward slant and is semi-circular in cross section for mating with a part of the outer portion of the wire ring 23. A second annular groove 24d is formed forward of the first annular groove 24c and has a greater maximum diameter than that of the first annular groove 24c, which is also opens on a radially inward, forward slant. An inclined surface 24e is formed forward of the second annular groove 24d and slopes clutch-ward and radially outward therefrom. The wire ring 23, in assemblage as shown in FIG. 2, presses the first annular groove 24c by its own elastic force. That is, when the wire ring is in neither compression nor expansion, its outside diameter is larger than the diameter of the first annular groove 24c. The inside diameter of the wire ring 23 fitted into the first annular groove 24c is less than the diameter of the tapered surface 22b.

A disc-shaped second bracket plate 28 is fixed to the front-side of the lever plate flange 24b. Between the radially inward portion of the second bracket plate 28 and the second annular groove 24d of the lever plate 24, a space is defined to accommodate the wire ring 23 in its free state. A cone spring 27 is disposed in this space, such that the cone spring 27 rests against the inclined surface 24e and its radially outward portion is supported against the second bracket plate 28 and its radially inward portion presses the wire ring 23 elastically rearward, toward the first annular groove 24c.

As apparent from the aforementioned description, the radially inward portion 8a of the diaphragm spring 8 is connected with the sleeve extension 22a of the inner race member through the lever plate 24 and the wire ring 23. In this case, a conventional wedge collar is omitted and the wire ring 23 by itself links the lever plate 24 and the sleeve extension 22a, whereby the linkage of this release assembly 3 is improved.

The process of assembly and disassembly of the clutch is explained as follows.

Figure 3:
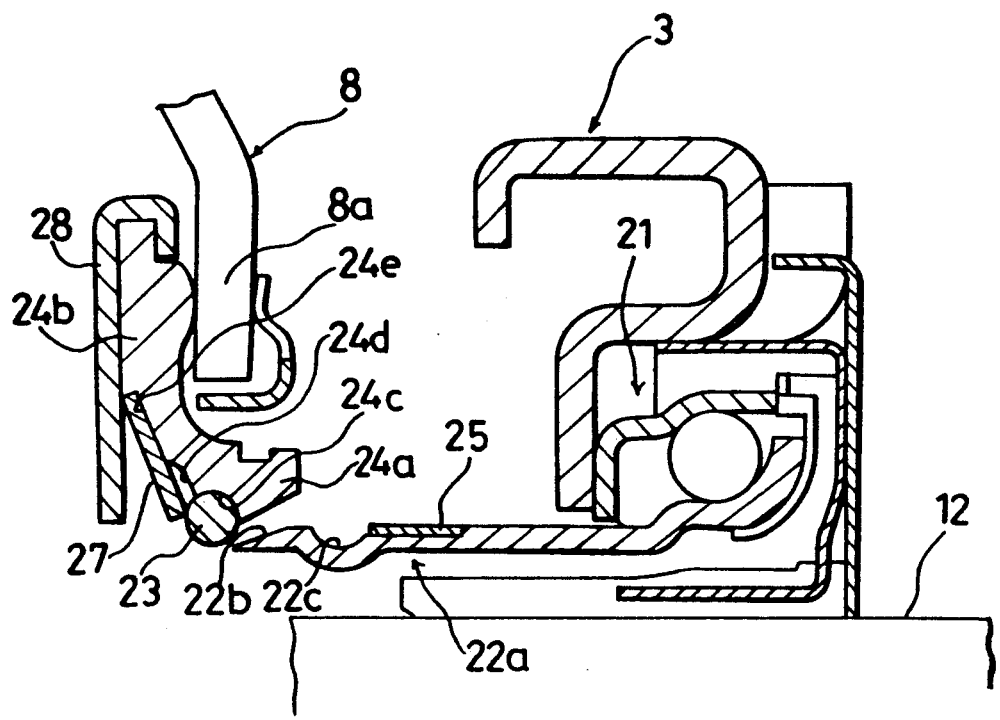
FIG. 3 is a view showing an assembly stage of the release assembly of FIG. 2.

The wire ring 23 is fitted into the first annular groove 24c of the lever plate 24, as shown in FIG. 3, before the release bearing 21 and the lever plate 24 are joined in assembly. The wire ring 23 is pressed against the first annular groove 24c by the cone spring 27, whereby it is prevented from moving axially. Moreover, the wire ring 23 is uniformly pressed by the inclined cone spring 27 toward the axis, thus it is kept coaxial with the other associated members. The wire spring 23 retained in place as aforementioned cannot slip out of the first annular groove in the axial direction and has no room to enter the space between the second annular groove 24d and the second support plate 28.

Figure 4:
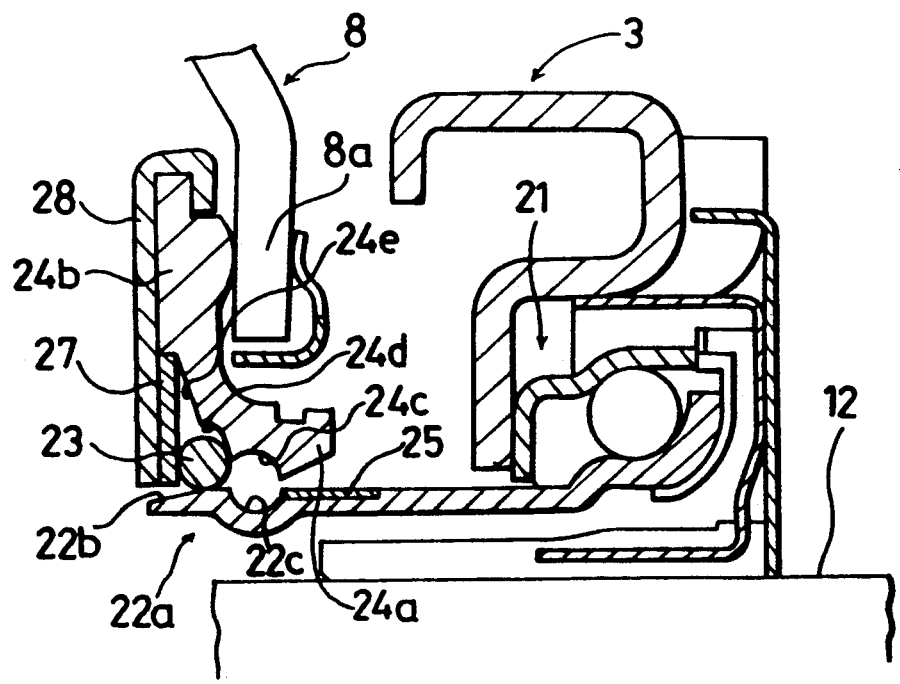
FIG. 4 is a view showing another assembly stage, corresponding to FIG. 3.

With the wire ring and lever plate in this state, the release bearing 21 is moved forward, the sleeve extension 22a being forcibly inserted into the interior of the hub portion 24a of the lever plate 24. First, the tapered surface 22b formed on the periphery at the tip of the sleeve extension portion 22a abuts against the inner portion of the wire ring 23. The release bearing 21 continues to move forward, so the wire ring 23 expands radially outward on the taper surface 22b and is also pushed forward. Thus wire ring 23 is driven out of the first annular groove, as shown in FIG. 4, and moves toward the second annular groove 24d. In the condition shown in FIG. 4, since the wire ring 23 is supported by the lever plate 24, the cone spring 27 and the sleeve extension 22a, it cannot move.

The release bearing 21 is moved forward further until the engagement groove 22c of the inner race extension portion 22a reaches the position corresponding to the temporary location of the wire ring 23. Then the wire spring 23 leaves the tapered surface 22b and is fitted into the engagement groove 22c, shrinking under its own elasticity.

Figure 2:
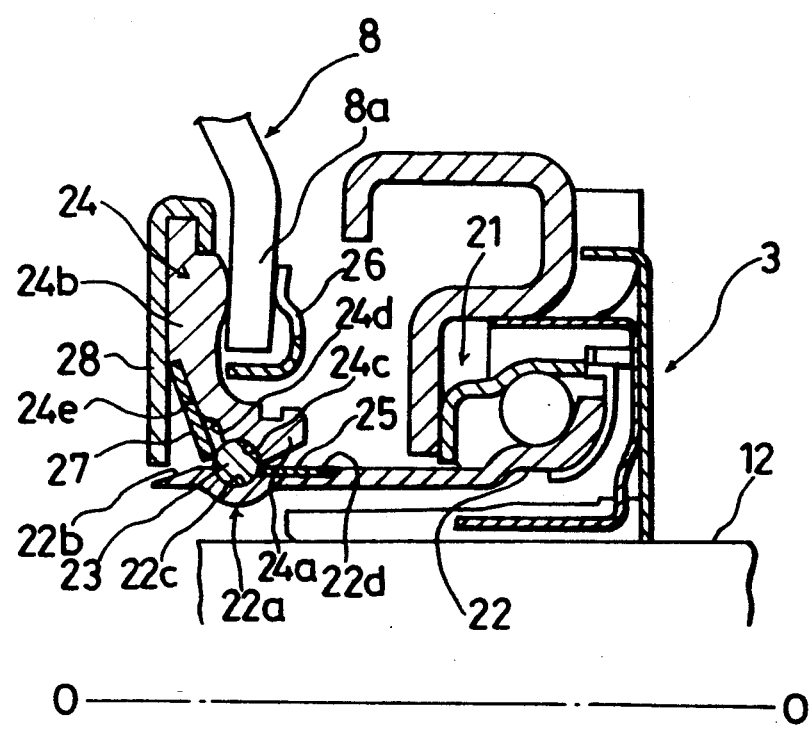
FIG. 2 is a partly in sectional view of an installed release assembly.

Then the release bearing 21 is drawn back, rearward, and the wire ring 23 is forced from the second annular groove 24d into the first annular groove 24c, the wire ring 23 thus being supported between the first annular groove 24c and the engagement groove 22c, as shown in FIG. 2. Accordingly, the release bearing 21 is fastened to the lever plate 24.

Figure 5:
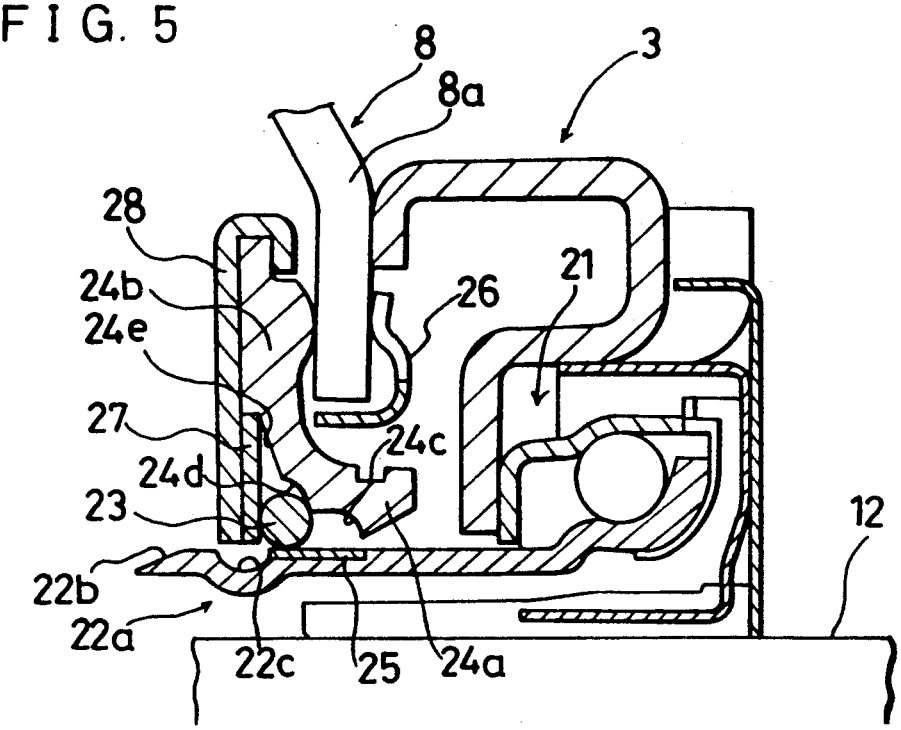
FIG. 5 is a view showing a stage of disassembly of the release assembly of FIG. 2.
Figure 6:
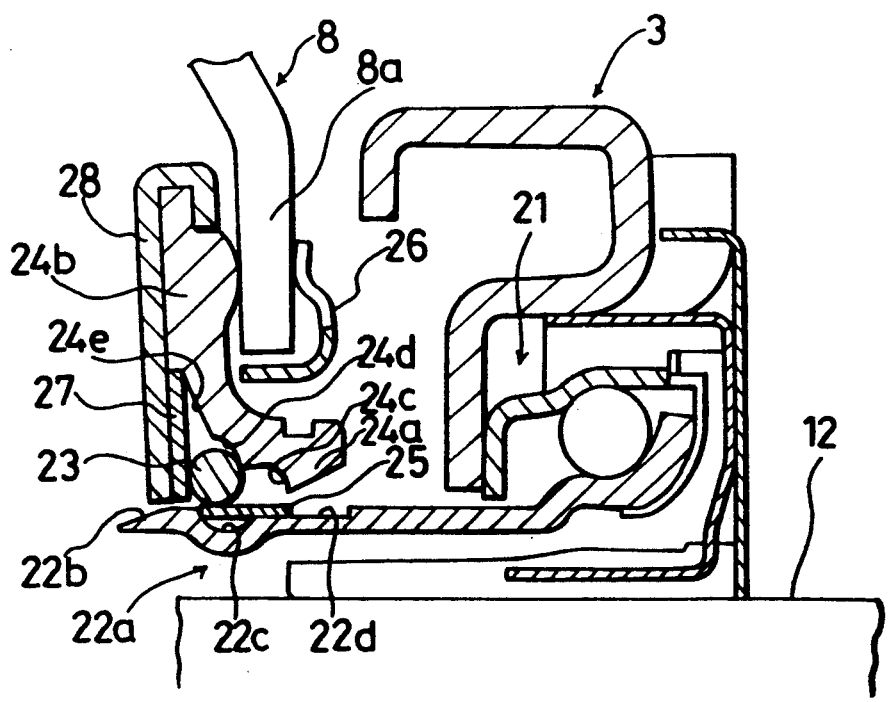
FIG. 6 is a view showing another stage of disassembly, corresponding to FIG. 5.

In disassembly, the release bearing 21 is moved forward, from the state as shown in FIG. 2. The wire ring 23 is pushed forward, overcoming the urging force of the cone spring 27. Then it leaves the first annular groove 24c and moves toward the second annular groove 24d, expanding radially outward. As apparent from FIG. 5, the wire ring 23 is set onto the slip collar 25 in this condition. Next, the release bearing 21 is drawn back, rearward, and the slip collar 25 remains in position retaining the wire ring 23 along its circumference. That is, only the sleeve extension 22a moves. Consequently, as shown in FIG. 6, the engagement groove 22c becomes enclosed by the slip collar 25.

The sleeve extension 22a is moved rearward further until the forward end of the slip collar 25 abuts against the end of the engagement groove 22c, which abutment then moves the slip collar 25 together with the sleeve extension 22a as it continues to be drawn rearward. Thus, the release bearing 21 is extracted from the lever plate 24, while the wire ring 23 is kept from slipping into the engagement groove 22c.

As aforementioned in detail, the wire ring 23 is retained in place by the cone spring 27 before and during assembly, whereby release assembly 3 may be smoothly assembled.

Various details of the invention may be changed without departing from its spirit nor its scope. Furthermore, the foregoing description of the embodiment according to the present invention is provided for the purpose of illustration only, and not for the purpose of limiting the invention as defined by the appended claims and their equivalents.

What is claimed is:

1. An assembly which releases a pull-type clutch by extracting the radially inward margin of a clutch diaphragm spring in the direction toward an associated transmission; comprising:
   a support member fixed to the radially inward margin of the clutch diaphragm spring;
   a wire ring retained along the interior of said support member and broken so as to be elastically deformable in the radial direction;
   a release bearing including an inner race member which is extended as a sleeve in the direction away from said transmission and is detachably fastened to said support member through said wire ring; and
   a retainer part for holding said wire ring in place in said support member during assemblage of said release bearing with said support member, said support member being composed of a hub portion extending axially, and a flange integral with said hub portion and extending radially outward; said hub portion having formed in a rim of its interior a first annular groove for receiving said wire ring along its outer surface, and a second annular groove formed adjacent said first annular groove away from said transmission, having a greater maximum diameter than that of said first annular groove, said retainer part including an elastic member for elastically pressing said wire ring against said first annular groove.

2. An assembly which releases a pull-type clutch by extracting the radially inward margin of a clutch diaphragm spring in the direction toward an associated transmission, comprising:
   a support member fixed to the radially inward margin of the clutch diaphragm spring;
   a wire ring retained along the interior of said support member and broken so as to be elastically deformable in the radial direction;
   a release bearing including an inner race member which is extended as a sleeve in the direction away from said transmission and is detachably fastened to said support member through said wire ring; and
   a retainer part for holding said wire ring in place in said support member during assemblage of said release bearing with said support member, said support member being composed of a hub portion extending axially, and a flange integral with said hub portion and extending radially outward; said hub portion having formed in a rim of its interior a first annular groove for receiving said wire ring along its outer surface, and a second annular groove formed adjacent said first annular groove away from said transmission, having a greater maximum diameter than that of said first annular groove, said retainer part including an elastic member for elastically pressing said wire ring against said first annular groove, said elastic member being a coned spring;
   said retaining part further including a discshaped support bracket fixed to a face of said flange which is away from said transmission; and
   the radially outward rim of said cone spring is supported by support bracket, and the radially inward margin of said cone spring presses said wire ring against said first annular groove.

3. An assembly according to claim 2 wherein
   said wire ring is circular in cross section;
   said first annular groove is semi-circular in cross section so as to mate with said wire ring, and opens in a direction away from said transmission.

4. An assembly according to claim 3, wherein a space is defined axially between said second annular groove and the radially inward margin of said support bracket, for accommodating said cone spring and said wire ring.

5. An assembly according to claim 4, wherein the outside diameter of said wire ring in its free state is greater than the maximum diameter of said first annular groove.

6. An assembly which releases a pull-type clutch by extracting the radially inward margin of a clutch diaphragm spring in the direction toward an associated transmission, comprising:
   a support member fixed to the radially inward margin of the clutch diaphragm spring;
   a wire ring retained along the interior of said support member and broken so as to be elastically deformable in the radial direction;
   a release bearing including an inner race member which is extended as a sleeve in the direction away from said transmission and is detachably fastened to said support member through said wire ring; and
   a retainer part for holding said wire ring in place in said support member during assemblage of said release bearing with said support member, said support member being composed of a hub portion extending axially, and a flange integral with said hub portion and extending radially outward; said hub portion having formed in a rim of its interior a first annular groove for receiving said wire ring along its outer surface, and a second annular groove formed adjacent said first annular groove away from said transmission, having a greater maximum diameter than that of said first annular groove;
   said sleeve extension of said release bearing having a third annular groove along its periphery for engagement with said wire along its inner surface, and a terminal surface feature of the extension sleeve formed clutch-ward from said third annular groove so as to have greater dimension radially than the inside diameter of said wire ring fitted into said first annular groove;
   said terminal feature of said sleeve extension being a tapered surface beveled such that its circumference increases in the direction from its tip end toward said third annular groove and further comprises a cylindrical member fitted onto a section of the periphery of said sleeve extension of said release bearing, slidable in the axial direction so as to enclose said third annular groove.

7. A pull-type clutch system for transmitting or breaking the transmission of power from a flywheel fixed to an engine output shaft, to a transmission input shaft, comprising:
- a clutch disc assembly whose peripheral portion mechanically contacts with said flywheel and whose radially inward portion is engaged with said transmission input shaft;
- a clutch cover assembly including a pressure plate so positioned that the peripheral portion of said clutch disc assembly is in a sandwich between said pressure plate and said flywheel, a diaphragm spring driving said pressure plate toward said flywheel, and a clutch cover supporting said pressure plate and said diaphragm spring; and
- a release assembly for drawing the radially inward margin of said diaphragm spring toward said transmission, including:
- a support member fixed to the radially inward margin of the clutch diaphragm spring;
- a wire ring retained along the interior of said support member and being broken so as to be elastically deformable in the radial direction;
- a release bearing including an inner race member which is extended as a sleeve in the direction away from said transmission and is detachably fastened to said support member through said wire ring; and
- a retaining part for holding said wire ring in place in said support member during assemblage of said release bearing with said support member;
- said support member being composed of a hub portion extending axially, and a flange integral with said hub portion and extending radially outward;
- said hub portion having formed in a rim or its interior a first annular groove for receiving said wire ring along its outer surface, and a second annular groove formed adjacent said first annular groove away from said transmission, having a greater maximum diameter than that of said first annular groove;
- said retaining part including a cone spring elastically pressing said wire ring against said first annular groove, and a disc-shaped support bracket fixed to a face of said flange which is toward said clutch disc assembly; and
- the radially outward rim of said cone spring is supported by said support bracket, and the radially inward margin of said cone spring presses said wire ring against said first annular groove.

8. A pull-type clutch system for transmitting or breaking the transmission of power from a flywheel fixed to an engine output shaft, to a transmission input shaft, comprising:
- a clutch disc assembly whose peripheral portion mechanically contacts with said flywheel and whose radially inward portion is engaged with said transmission input shaft;
- a clutch cover assembly including a pressure plate so positioned that the peripheral portion of said clutch disc assembly is in a sandwich between said pressure plate and said flywheel, a diaphragm spring driving said pressure plate toward said flywheel, and a clutch cover supporting said pressure plate and said diaphragm spring; and
- a release assembly for drawing the radially inward margin of said diaphragm spring toward said transmission, including:
- a support member fixed to the radially inward margin of the clutch diaphragm spring;
- a wire ring retained along the interior of said support member and being broken so as to be elastically deformable in the radial direction;
- a release bearing including an inner race member which is extended as a sleeve in the direction away from said transmission and is detachably fastened to said support member through said wire ring; and
- a retaining part for holding said wire ring in place in said support member during assemblage of said release bearing with said support member;
- said support member being composed of a hub portion extending axially, and a flange integral with said hub portion and extending radially outward;
- said hub portion having formed in a rim or its interior a first annular groove for receiving said wire ring along its outer surface, and a second annular groove formed adjacent said first annular groove away from said transmission, having a greater maximum diameter than that of said first annular groove;
- said terminal surface feature of said sleeve extension being a tapered surface beveled such that it circumference increases in the direction from its tip end toward said third annular groove; and
- a cylindrical member fitted onto a section of the periphery of said sleeve extension of said release bearing, slidable in the axial direction so as to enclose said third annular groove.

* * * * *